(12) United States Patent
Huang

(10) Patent No.: US 11,067,394 B2
(45) Date of Patent: Jul. 20, 2021

(54) SPIRIT LEVEL WITH A LIGHTING DEVICE THEREIN

(71) Applicant: Cheng-Hsiung Huang, Taipei (TW)

(72) Inventor: Cheng-Hsiung Huang, Taipei (TW)

( * ) Notice: Subject to any disclaimer, the term of this patent is extended or adjusted under 35 U.S.C. 154(b) by 132 days.

(21) Appl. No.: 16/670,538

(22) Filed: Oct. 31, 2019

(65) Prior Publication Data

US 2021/0131803 A1 May 6, 2021

(51) Int. Cl.
*G01C 9/32* (2006.01)
*G01C 9/34* (2006.01)

(52) U.S. Cl.
CPC ........ *G01C 9/32* (2013.01); *G01C 9/34* (2013.01)

(58) Field of Classification Search
CPC .................................. G01C 9/32; G01C 9/34
USPC .......................................................... 33/348.2
See application file for complete search history.

(56) References Cited

U.S. PATENT DOCUMENTS

| | | | | |
|---|---|---|---|---|
| 5,180,221 A * | 1/1993 | Yoder | .................. | F21V 33/008 33/348.2 |
| 6,681,494 B1 * | 1/2004 | Bowden | .................. | G01C 9/24 33/379 |
| 8,925,212 B2 * | 1/2015 | Allemand | ................ | G01C 9/32 33/348.2 |
| 2011/0265339 A1 * | 11/2011 | Allemand | ................ | G01C 9/32 33/366.23 |
| 2014/0101950 A1 * | 4/2014 | Zhuang | ..................... | G01C 9/32 33/348.2 |
| 2015/0308822 A1 * | 10/2015 | Meadows | ................ | G01C 9/34 33/381 |
| 2017/0343348 A1 * | 11/2017 | Doeren | ..................... | G01C 9/28 |

* cited by examiner

*Primary Examiner* — George B Bennett

(57) ABSTRACT

A spirit level includes a housing having an elongated body and a level tube set and a lighting device mounted in the body of the housing. The body has a recessed accommodation chamber and two positioning grooves connected to the recessed accommodation chamber and disposed adjacent to the end portions of the level tubes of the level tube set. The lighting device includes a controller mounted in the recessed accommodation chamber and a plurality of light-emitting devices respectively mounted in the positioning grooves for illuminating the level tubes so that the user can see the level tubes. The invention simplifies the assembly of the spirit level and makes it easy to repair or replace the light-emitting devices of the lighting device without increasing the height or thickness of the spirit level.

8 Claims, 10 Drawing Sheets

US 11,067,394 B2

SPIRIT LEVEL WITH A LIGHTING DEVICE THEREIN

BACKGROUND OF THE INVENTION

1. Field of the Invention

The present invention relates to spirit level technology and more particularly, to a spirit level with a lighting device therein, which lets the level tubes be more clearly visible at night or in low light workplaces.

2. Description of the Related Art

The spirit level is often used in the construction industry to determine the angular orientation of the level relative to the surface on which the spirit level is placed. In the process of decoration, there are often problems with insufficient lighting, which makes it difficult for the user to correctly interpret the status displayed by the spirit level. To solve this problem, the relevant manufacturer installs a light-emitting device on the side of the level tube, and when the spirit level is used, the bubble in the level tube can be recognized by the illumination of the light-emitting device. FIG. 10 illustrates a spirit level according to the prior art. According to this design, the body A of the spirit level is made of aluminum extrusion and processed to provide positioning holes A1. When assembling, the level tubes B and the light-emitting devices C are respectively positioned in the positioning holes A1, and the light-emitting devices C are electrically connected to the controller D by using electrical wires C1. To be able to connect the electrical wires C1 to the controller D, when the body A is extruded, a wire hole A2 penetrating through the ends of the body A must be reserved on the body A. Therefore, this prior art design has the following deficiencies:

1. The light-emitting devices C must be positioned in the respective positioning holes A1 and then the electrical wires C1 must be inserted through the wire hole A2 and then connected to the controller D, which causes inconvenience in assembly, and when the replacement of the light-emitting devices C is performed, it is also quite troublesome.

2. In addition to increasing the height of the body A and increasing the manufacturing cost, the wire hole A2 will cause the body A to be easily deformed during protrusion, and the straightness of the body A will decrease, leading to a decrease in the measuring accuracy of the spirit level.

SUMMARY OF THE INVENTION

The present invention has been accomplished under the circumstances in view. Therefore, the main object of the present invention to provide a spirit level with a lighting device therein, which simplifies the assembly of the spirit level and makes it easy to repair or replace the light-emitting devices of the lighting device without increasing the height or thickness of the spirit level.

To achieve this and other objects of the present invention, a spirit level comprises a housing, a level tube set and a lighting device. The housing comprises an elongated body defining a length. The body has at least one first opening and at least one second opening respectively disposed near two opposite ends thereof. The level tube set comprises at least one first level tube and at least one second level tube. Each first level tube is mounted in one respective first opening of the body in a horizontal relationship with the length of the body. Each second level tube is mounted in one respective second opening of the body and disposed perpendicular or inclined to the length of the body. The body of the housing further comprises a recessed accommodation chamber disposed between the at least one first opening and the at least one second opening, a first positioning groove connected to the recessed accommodation chamber and the at least one first opening and disposed adjacent to one end of each first level tube, and a second positioning groove connected to the recessed accommodation chamber and the at least one second opening and disposed adjacent to one end of each second level tube. The lighting device comprises a controller mounted in the recessed accommodation chamber, a first light set mounted in the first positioning groove and electrically connected to the controller, and a second light set mounted in the second positioning groove and electrically connected to the controller.

DETAILED DESCRIPTION OF THE PREFERRED EMBODIMENT

Figure 1:
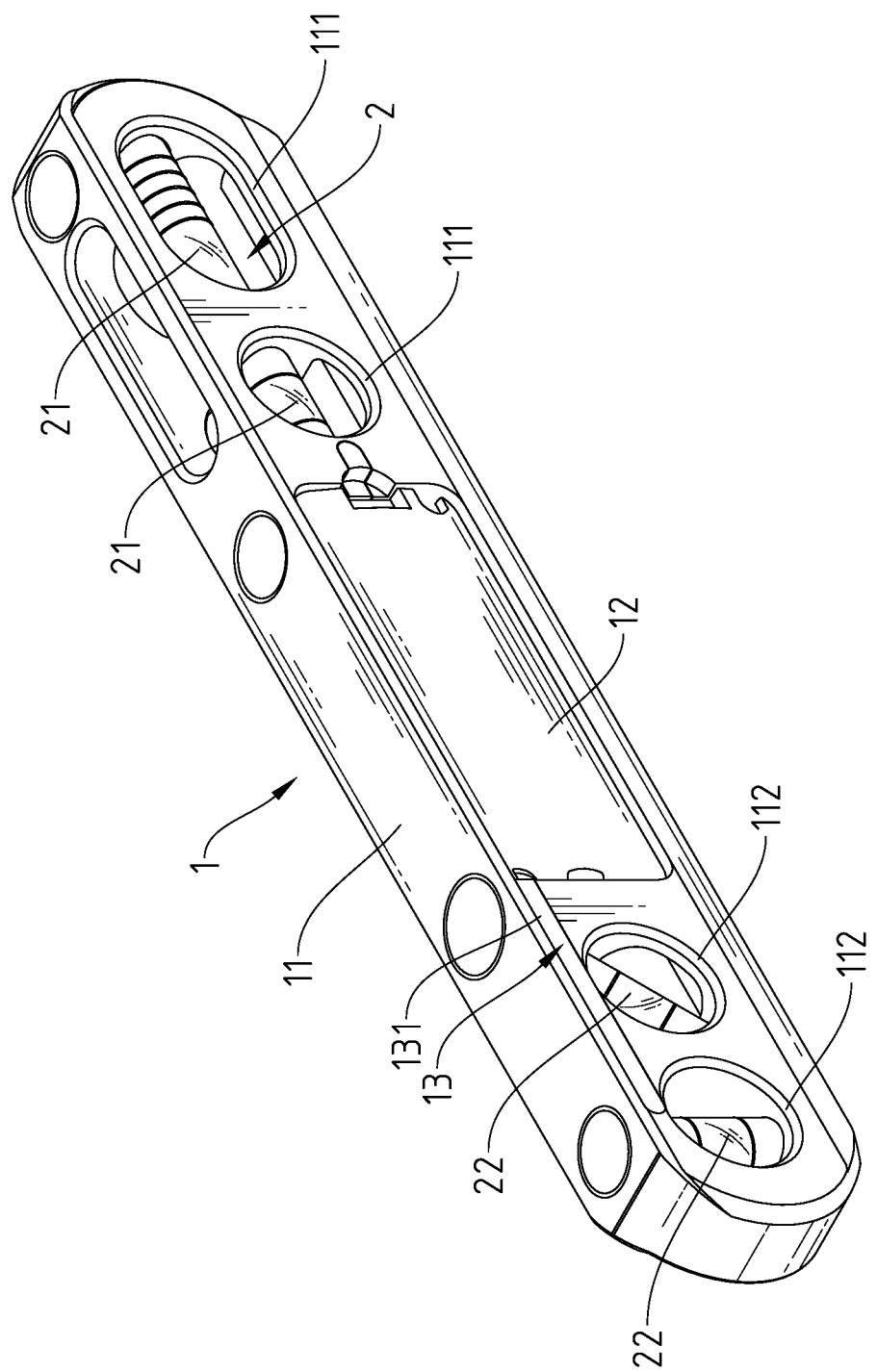
FIG. 1 is an oblique top elevation of a spirit level embodying the present invention.
Figure 2:
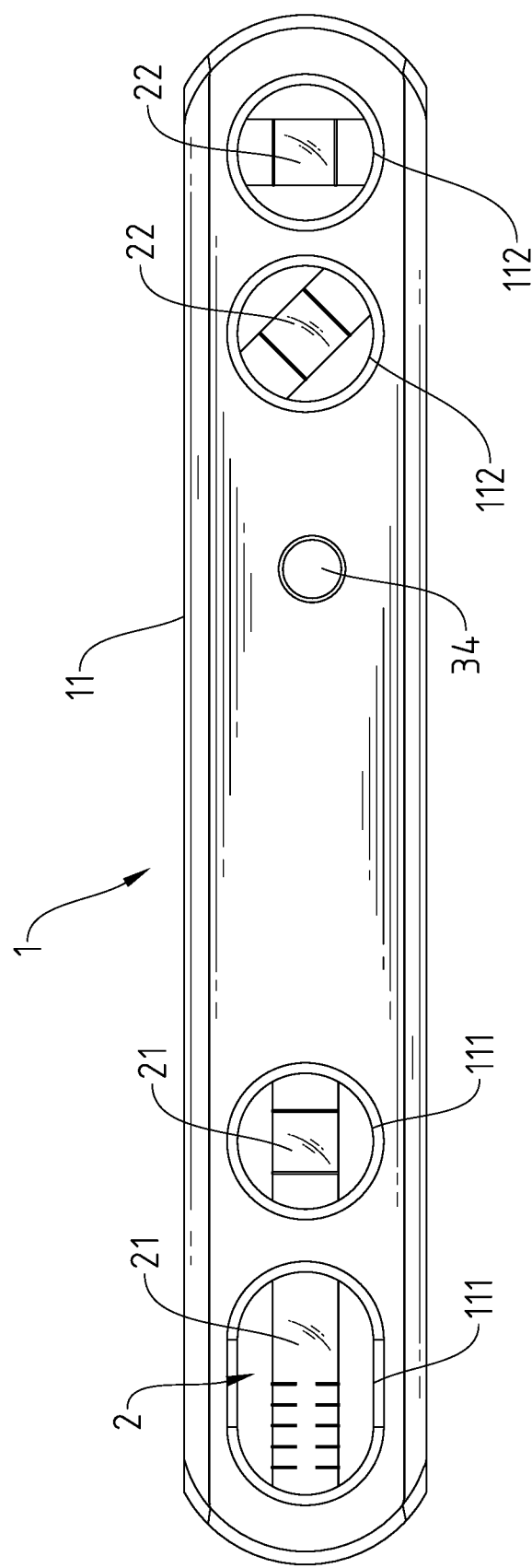
FIG. 2 is a front view of the spirit level of the present invention.
Figure 3:
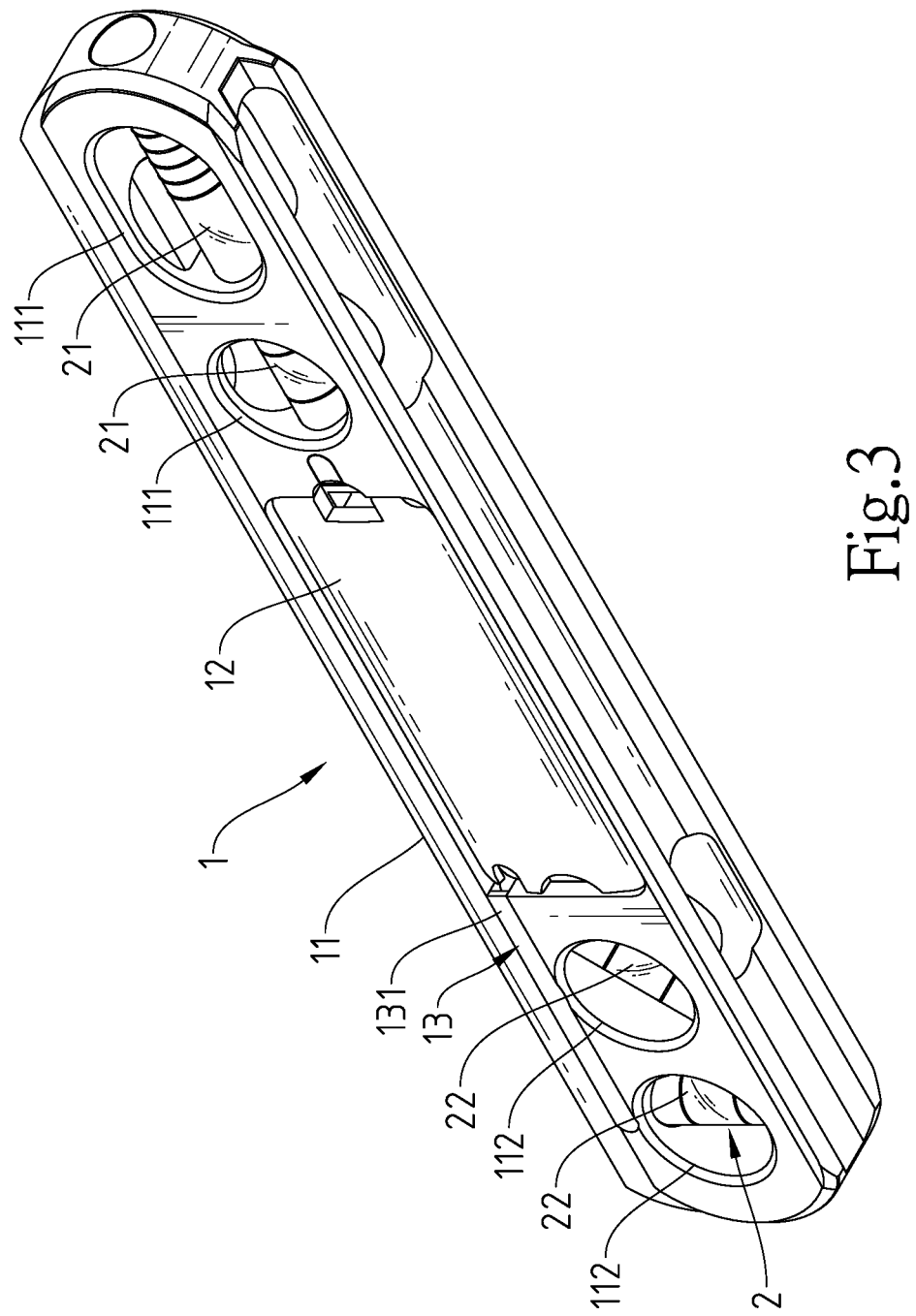
FIG. 3 corresponds to FIG. 1 when viewed from another angle.
Figure 4:
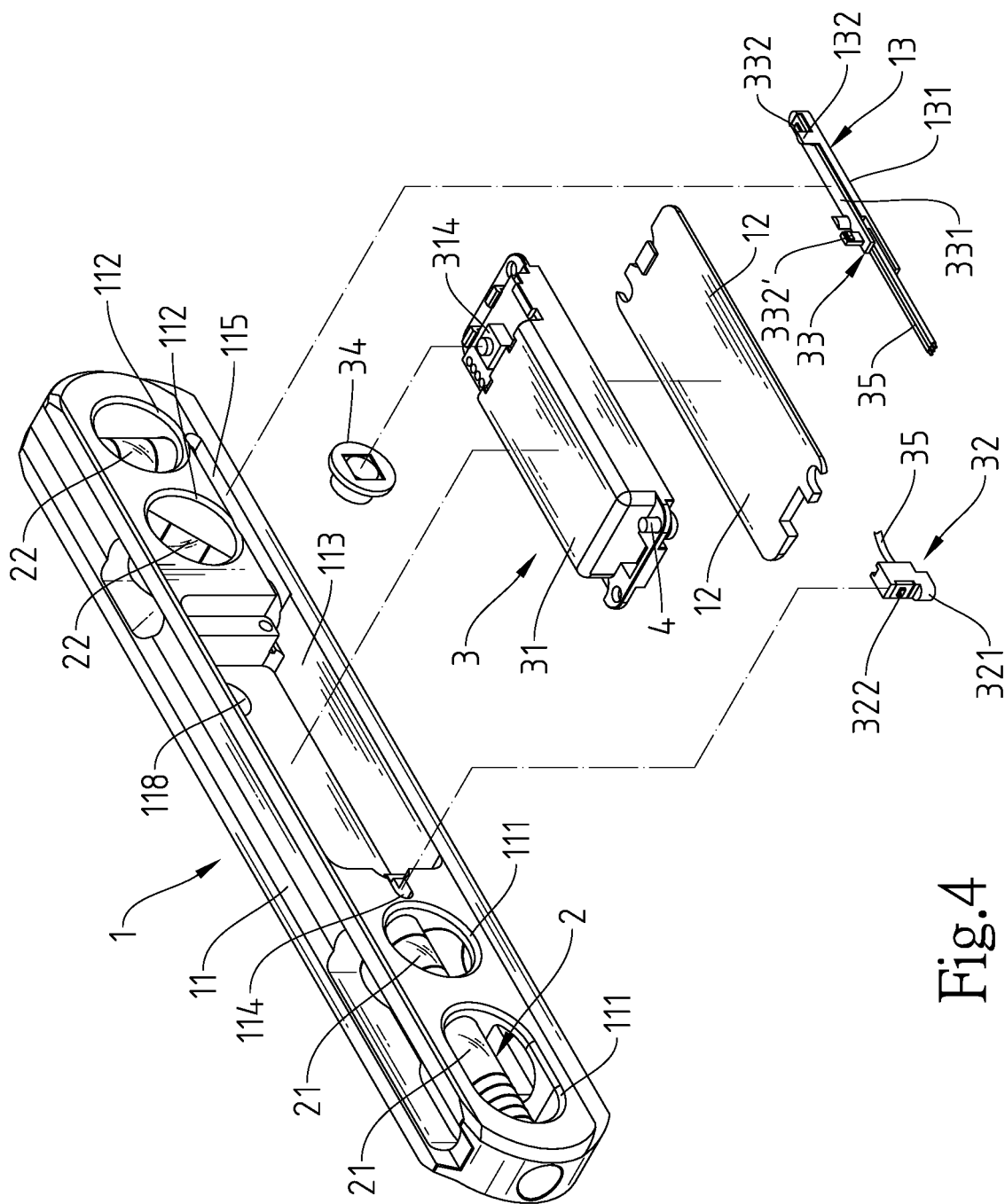
FIG. 4 is an exploded view of the spirit level embodying the present invention.
Figure 5:
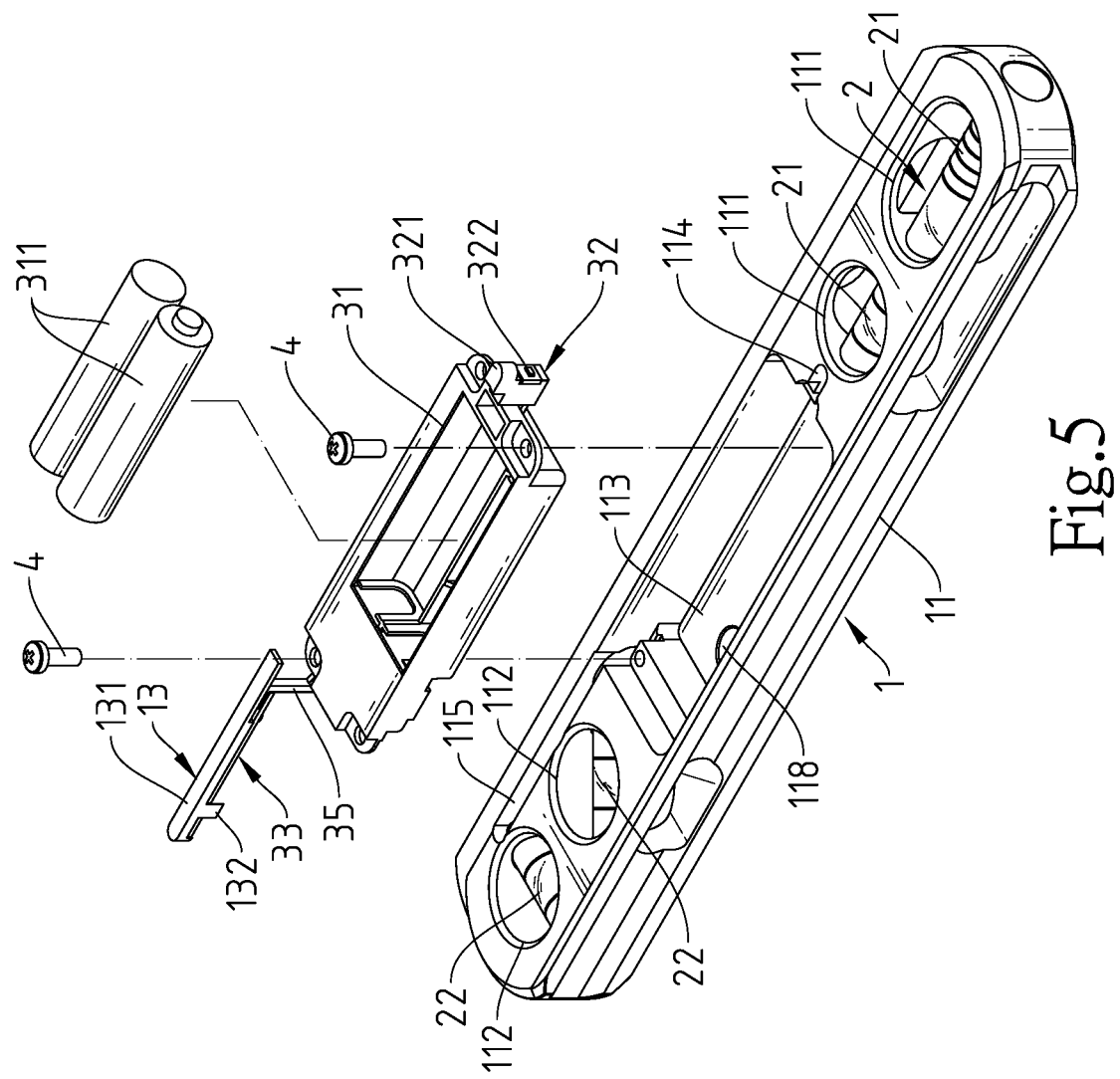
FIG. 5 is a schematic drawing of the present invention, illustrating the installation of the lighting device in the housing.
Figure 6:
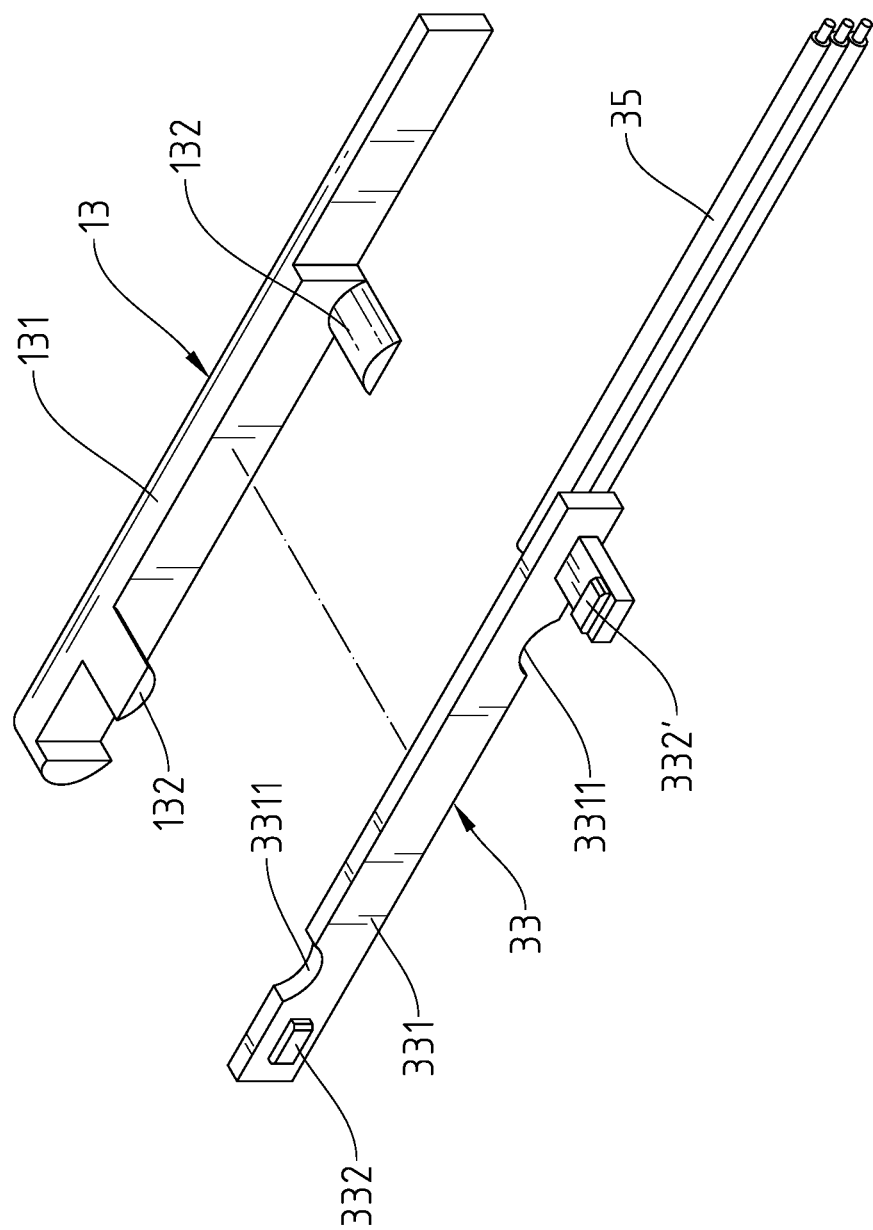
FIG. 6 is an exploded view of the second cover and the second light set.
Figure 7:
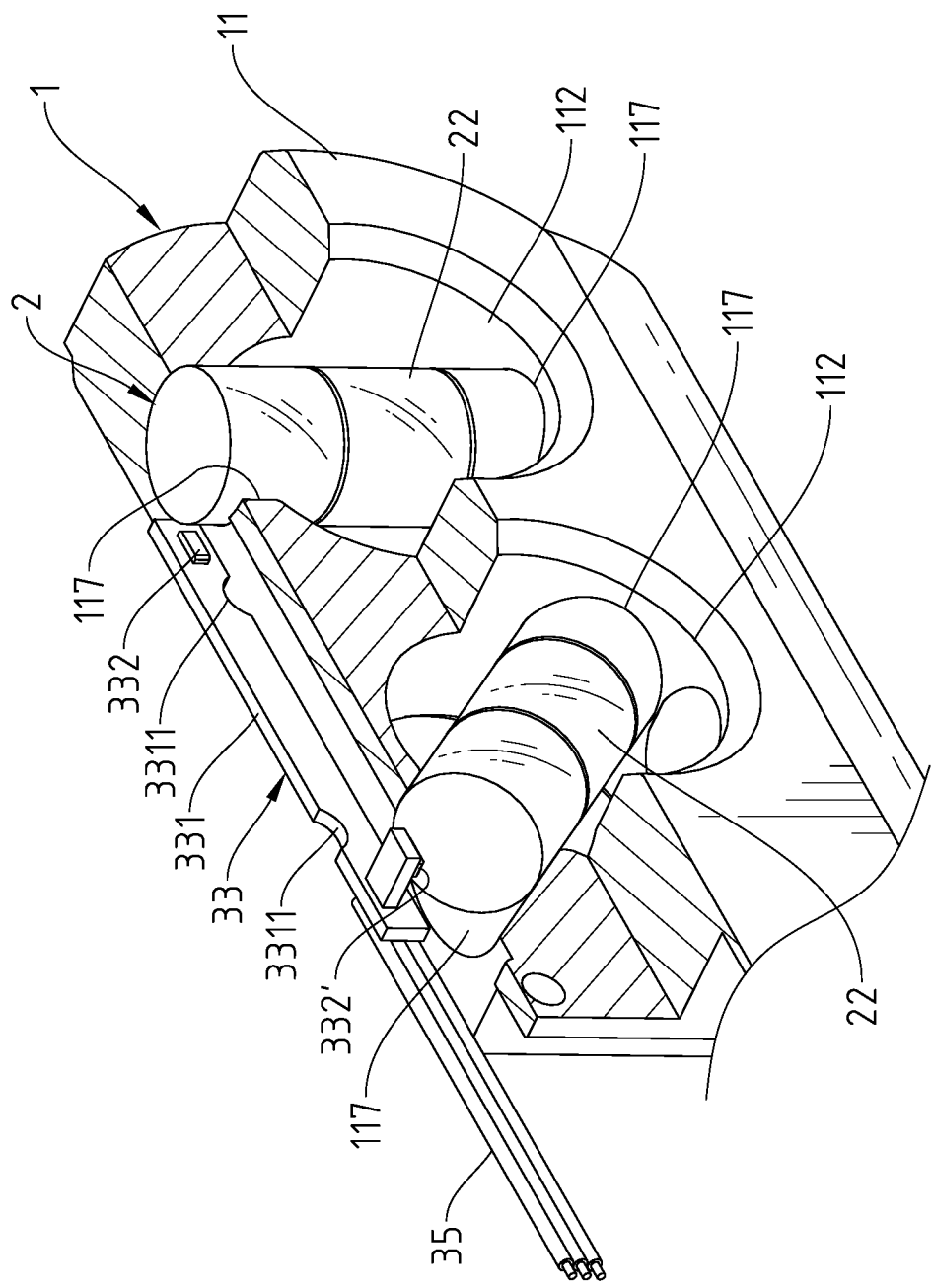
FIG. 7 is a sectional elevation of a part of the present invention, illustrating the second level tubes positioned in the body of the housing.
Figure 8:
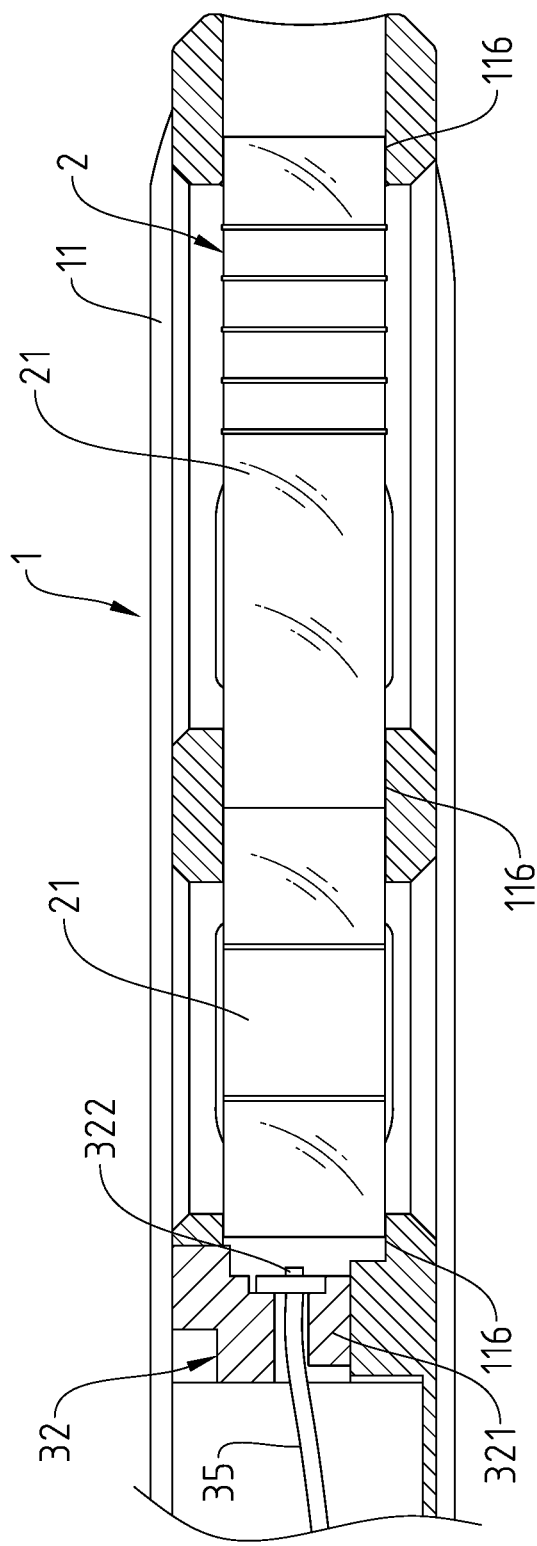
FIG. 8 is a sectional view of a part of the present invention, illustrating the first level tubes positioned in the body of the housing.
Figure 9:
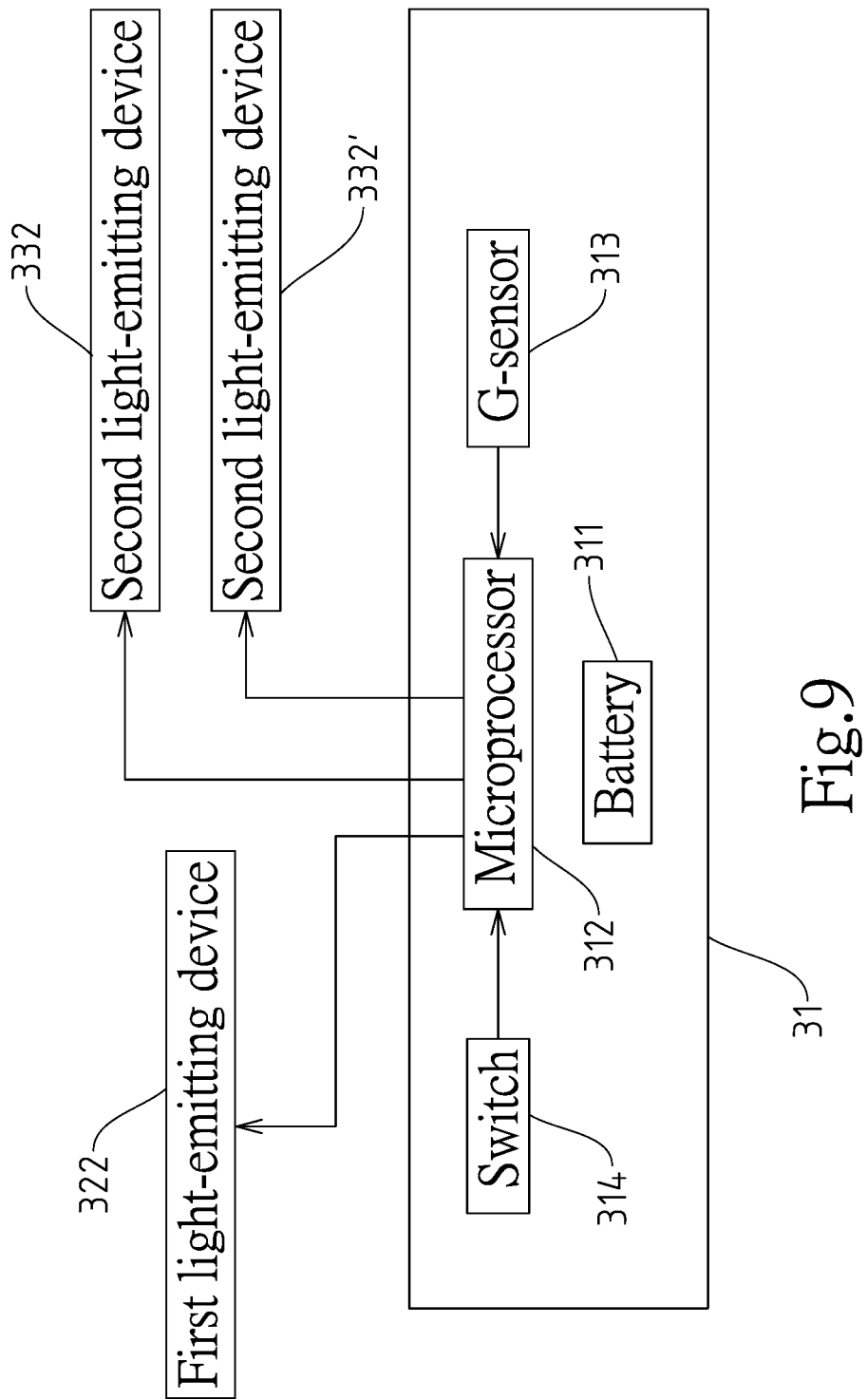
FIG. 9 is a block diagram of the present invention.
Figure 10:
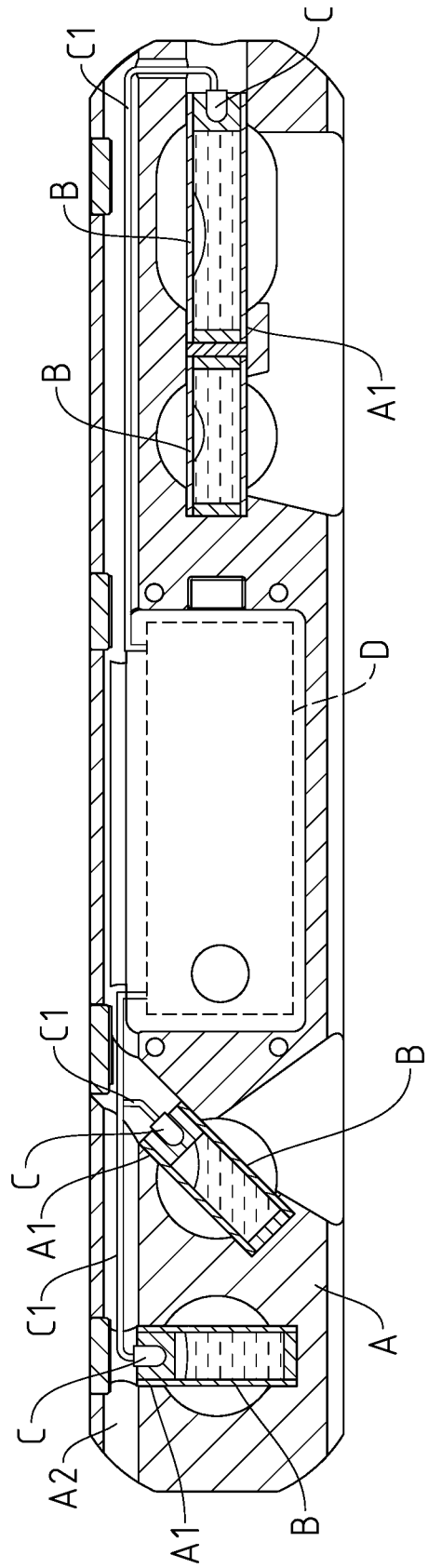
FIG. 10 illustrates a spirit level according to the prior art.

Referring to FIGS. 1-9, a spirit level with a lighting device therein embodying the present invention is shown. The spirit level comprises a housing (1), a level tube set (2) and a lighting device (3).

The housing (1) comprises a body (11), a first cover (12) and a second cover (13). The body (11) is elongated, having a plurality of first openings (111) arranged in parallel near one end and spaced along the length thereof, a plurality of second opening (112) arranged in parallel near an opposite end and spaced along the length the body (11), two first positioning holes (116) respectively located on two opposite sides of each first opening (111) and horizontally formed with the body (11), two second positioning holes (117) respectively located on two opposite sides of each second opening (112) and respectively disposed perpendicular and inclined to the length of the body (11), a recessed accommodation chamber (113) disposed between the first openings (111) and the second openings (112), a first positioning groove (114) and a second positioning groove (115) respectively connected to the recessed accommodation chamber (113) and a through-hole (118) located on a bottom side of the recessed accommodation chamber (113). The first positioning groove (114) is disposed in communication with the first openings (111) through the first positioning holes (116). The second positioning groove (115) is disposed in communication with the second openings (112) through the second positioning holes (117). The first positioning holes (116) between two adjacent first openings (111) are connected. Furthermore, the second cover (13) comprises a cover plate (131) and a positioning post (132) protruding from each of two opposite sides of the cover plate (131).

The level tube set (2) comprises a plurality of first level tubes (21) and a plurality of second level tubes (22). The first level tubes (21) are respectively mounted in the first openings (111) of the body (11) with respective opposite ends thereof respectively positioned in the respective first positioning holes (116) so that the first level tubes (21) are arranged in a straight line in a horizontal relationship with the length of the body (11). The second level tubes (22) are respectively mounted in the second openings (112) of the body (11) with respective opposite ends thereof respectively positioned in the respective second positioning holes (117) so that the second level tubes (22) are respectively disposed perpendicular or inclined to the length of the body (11). In the preferred embodiment of the present invention, the first level tubes (21) are used to measure the horizontality and the tilt angle respectively, and the second level tubes (22) are used to measure the verticality and the 45-degree angle respectively.

The lighting device (3) comprises a controller (31), a first light set (32) and a second light set (33). The controller (31) is provided with a switch (314) and a button (34) connected to the switch (314). The first light set (32) comprises a first positioning member (321) and a first light-emitting device (322). The first positioning member (321) is mounted in the first positioning member (321) and electrically connected to the controller (31) by an electrical wire (35). The second light set (33) comprises a second positioning member (331) and a plurality of second light-emitting devices (332,332') mounted in the second positioning member (331) and electrically connected to the controller (31) by an electrical wire (35). The second positioning member (331) has a positioning recess (3311) located on each of two opposite sides thereof.

When the lighting device (3) is installed in the body (11) of the housing (1), electrically connect the controller (31), the first light set (32) and the second light set (33) of the lighting device (3) by electrical wires (35) at first, then place the controller (31) in the recessed accommodation chamber (113) and affix the controller (31) to the inside of the recessed accommodation chamber (113) with fastening members (4) to let the button (34) be exposed by the through hole (118), and then place the first light set (32) in the first positioning groove (114) and the second light set (33) in the second positioning groove (115) to let the first positioning member (321) of the first light set (32) be positioned in the first positioning groove (114) and the first light-emitting device (322) be directed to the first positioning holes (116) and also to let the second positioning member (331) of the second light set (33) be positioned in the second positioning groove (115) and the second light-emitting devices (332, 332') be directed to the second positioning hole (117) at the lateral side of each second opening (112), and then cover the first cover (12) on the recessed accommodation chamber (113) of the body (11) and the second cover (13) on the second positioning groove (115) of the body (11). When the second cover (13) is covered on the second positioning groove (115) of the body (11), the positioning posts (132) of the second cover (13) are inserted through the positioning recesses (3311) respectively, enabling the second positioning member (331) be positioned between the positioning posts (132). Thus, the lighting device (3) is installed in the housing (1). When the user presses the button (34) to switch on the switch (314), the controller (31) turns on the first light-emitting device (322) and the second light-emitting devices (332,332') to illuminate the first level tubes (21) and the second level tubes (22).

Referring to FIGS. 2, 4 and 9 again, it can be seen from the drawings that the controller (31) is further provided with a battery (311) and a microprocessor (312), and the microprocessor (312) is electrically connected with a G-sensor (313) and the aforesaid switch (314). The first light-emitting device (322) of the first light set (32) is electrically connected to the microprocessor (312). The second light-emitting devices (332,332') of the second light set (33) are electrically connected to the microprocessor (312). When the user presses the button (34) to switch on the switch (314), the first light-emitting device (322) and the second light-emitting devices (332,332') are turned on to provide illumination in a low light workplaces, and the G-sensor (313) detects the angle of the body (11) and transmits the detected angle information to the microprocessor (312), allowing the microprocessor (312) to control and enhance the illuminance of the first light-emitting device (322) and the second light-emitting devices (332) according to the angle information detected by the G-sensor (313).

For example, when the body (11) is placed horizontally, increase the illumination of the first light-emitting device (322), and increase the illumination of the second light-emitting device (332) when the body (11) is placed vertically; when the body (11) is tilted (45 degrees), the illumination of the second light-emitting device (332') is increased. Thus, the user can easily know the approximate angular range of the object according to the intensity of the light of the light-emitting devices.

Therefore, the present invention can solve the deficiencies and shortcomings of the prior art, and can improve the efficiency, and the key technology lies in that the body (11) is configured to provide a recessed accommodation chamber (113) and a first positioning groove (114) and a second positioning groove (115) respectively connected to the recessed accommodation chamber (113), and the controller (31), the first light set (32) and the second light set (33) of the lighting device (3) are electrically connected with electrical wires (35) and then respectively positioned in the recessed accommodation chamber (113), the first positioning groove (114) the second positioning groove (115), facilitating assembly; when the first light set (32) or the second light set (33) is damaged, it can be removed and replaced directly; furthermore, since the body (11) does not need to reverse a wire hole as disclosed in the prior art, there is no problem of increasing the height or thickness of the body (11) and lowering the straight line alignment of the body (11).

What the invention claimed is:

1. A spirit level, comprising a housing, a level tube set and a lighting device, said housing comprising a body defining a length, said body having at least one first opening and at least one second opening respectively disposed near two opposite ends thereof, said level tube set comprising at least one first level tube and at least one second level tube, each said first level tube being mounted in one respective said first opening of said body in a horizontal relationship with the length of said body, each said second level tube being mounted in one respective said second opening of said body and disposed perpendicular or inclined to the length of said body, wherein:

said body of said housing further comprises a recessed accommodation chamber disposed between said at least one first opening and said at least one second opening, a first positioning groove connected to said recessed accommodation chamber and said at least one first opening and disposed adjacent to one end of each said first level tube and a second positioning groove connected to said recessed accommodation chamber and said at least one second opening and disposed adjacent to one end of each said second level tube; said lighting device comprises a controller mounted in said recessed accommodation chamber, a first light set mounted in said first positioning groove and electrically connected to said controller and a second light set mounted in said second positioning groove and electrically connected to said controller.

2. The spirit level as claimed in claim 1, wherein said housing further comprises a first cover covering said recessed accommodation chamber of said body, and a second cover covering said second positioning groove of said body.

3. The spirit level as claimed in claim 1, wherein said body further comprises two first positioning holes respectively located on two opposite sides of each said first opening; said first light set comprises a first positioning member positioned in said first positioning groove to face said first positioning holes, and a first light-emitting device mounted in said first positioning member for illuminating the said end of each said first level tube.

4. The spirit level as claimed in claim 3, wherein the number of said at least one first opening of said body is plural, and the multiple said first openings are arranged side by side; said level tube set comprises a plurality of said first level tubes respectively mounted in said first openings; the said first positioning holes between two adjacent said first openings are connected, so that said first level tubes set in the respective said first openings are aligned in a straight line.

5. The spirit level as claimed in claim 1, wherein said body further comprises two second positioning holes respectively located on two opposite sides of each said second opening; each said second level tube has two opposite ends thereof respectively positioned in the said two second positioning holes on the two opposite sides of one respective said second opening; said second light set comprises a second positioning member positioned in said second positioning groove and a plurality of second light-emitting devices mounted in said positioning member to face said second positioning holes for illuminating the said end of each said second level tube.

6. The spirit level as claimed in claim 5, wherein the number of said at least one second opening of said body is plural, and the multiple said second openings are arranged side by side; said second level tubes of said level tube set are respectively mounted in said second openings; said second light-emitting devices of said second light set are mounted in said second positioning member, each directed to the said second positioning hole at one lateral side of the respective said second opening.

7. The spirit level as claimed in claim 1, wherein said second light set comprises a second positioning member positioned in said second positioning groove and a plurality of second light-emitting devices mounted in said positioning member to face said second positioning holes, said second positioning member comprising two positioning recesses respectively located on two opposite sides thereof; said housing further comprises a first cover covering said recessed accommodation chamber of said body, and a second cover covering said second positioning groove of said body, said second cover comprising a cover plate and two positioning posts respectively protruding from two opposite sides of said cover plate and respectively inserted through said positioning recesses for allowing said second positioning member to be positioned between said positioning posts.

8. The spirit level as claimed in claim 1, wherein said first light set comprises a first light-emitting device; said second light set comprises a second light-emitting device; said controller of said lighting device comprises a battery, a microprocessor electrically connected with said battery, said first light-emitting device and said second light-emitting device, a G-sensor electrically connected to said microprocessor for detecting the angle of said body and a switch electrically connected to said microprocessor, said microprocessor controlling and enhancing the illuminance of said first light-emitting device and said second light-emitting device according to the angle of said body detected by said G-sensor.

* * * * *